(12) United States Patent
Kfir et al.

(10) Patent No.: US 10,911,487 B2
(45) Date of Patent: Feb. 2, 2021

(54) ON-DEVICE NETWORK PROTECTION

(71) Applicant: CHECKPOINT MOBILE SECURITY LTD, Tel Aviv (IL)

(72) Inventors: Barak Kfir, Givat Shmuel (IL); Yuval Raban, Raanana (IL); Pavel Berengoltz, Petah-Tikva (IL)

(73) Assignee: CHECKPOINT MOBILE SECURITY LTD, Tel Aviv (IL)

( * ) Notice: Subject to any disclaimer, the term of this patent is extended or adjusted under 35 U.S.C. 154(b) by 343 days.

(21) Appl. No.: 16/012,792

(22) Filed: Jun. 20, 2018

(65) Prior Publication Data
US 2019/0394234 A1 Dec. 26, 2019

(51) Int. Cl.
*G06F 12/14* (2006.01)
*H04L 29/06* (2006.01)
*G06F 21/56* (2013.01)

(52) U.S. Cl.
CPC ...... *H04L 63/1483* (2013.01); *H04L 63/1416* (2013.01); *H04L 63/1425* (2013.01); *H04L 63/20* (2013.01)

(58) Field of Classification Search
CPC ............. H04L 63/0236; H04L 63/1416; H04L 63/1425; H04L 63/145; H04L 63/1483; H04L 63/20; H04W 12/1202; H04W 12/1204; H04W 12/1208
See application file for complete search history.

(56) References Cited

U.S. PATENT DOCUMENTS

| | | | |
|---|---|---|---|
| 7,516,488 B1 * | 4/2009 | Kienzle | H04L 51/12 726/22 |
| 7,694,150 B1 * | 4/2010 | Kirby | G06F 21/56 713/188 |
| 9,178,901 B2 * | 11/2015 | Xue | H04L 63/1425 |
| 9,444,839 B1 * | 9/2016 | Faulkner | H04L 63/168 |
| 9,578,052 B2 * | 2/2017 | Cp | H04L 63/20 |
| 10,158,677 B1 * | 12/2018 | DiCorpo | H04L 51/12 |
| 2006/0101334 A1 * | 5/2006 | Liao | H04L 51/18 715/205 |
| 2007/0136806 A1 * | 6/2007 | Berman | H04L 51/12 726/22 |
| 2007/0199054 A1 * | 8/2007 | Florencio | H04L 63/1441 726/5 |
| 2009/0019121 A1 * | 1/2009 | Mears | G06Q 10/107 709/206 |
| 2009/0138699 A1 * | 5/2009 | Miyazaki | H04L 9/0894 713/150 |

(Continued)

FOREIGN PATENT DOCUMENTS

KR 101265448 B1 * 5/2013

OTHER PUBLICATIONS

Y. Cheng, Z. Yuan, L. Ma and R. Deng, "An Information-Sharing Based Anti-Phishing System," The First International Symposium on Data, Privacy, and E-Commerce (ISDPE 2007), Chengdu, Sichuan, 2007, pp. 265-270, doi: 10.1109/ISDPE.2007.65. (Year: 2007).*

(Continued)

*Primary Examiner* — Michael Simitoski
(74) *Attorney, Agent, or Firm* — Mark M. Friedman

(57) ABSTRACT

Methods performed by a system on a computer device, such as a smart phone, i.e., locally, for protecting against network-based attacks. These methods inspect all traffic to every application and web browser on the device.

18 Claims, 4 Drawing Sheets

(56) References Cited

U.S. PATENT DOCUMENTS

| | | | |
|---|---|---|---|
| 2009/0300768 A1* | 12/2009 | Krishnamurthy | H04L 63/1483 726/26 |
| 2010/0218253 A1* | 8/2010 | Sutton | G06F 21/554 726/23 |
| 2011/0047620 A1* | 2/2011 | Mahaffey | H04L 63/1441 726/23 |
| 2011/0320393 A1* | 12/2011 | Pandya | G06F 16/90344 706/45 |
| 2012/0144488 A1* | 6/2012 | Sankruthi | G06F 21/564 726/24 |
| 2012/0151033 A1* | 6/2012 | Baliga | H04W 12/1202 709/224 |
| 2012/0185942 A1* | 7/2012 | Dixon | G06Q 10/06 726/24 |
| 2012/0324568 A1* | 12/2012 | Wyatt | H04L 63/101 726/13 |
| 2014/0059525 A1* | 2/2014 | Jawa | G06F 8/54 717/162 |
| 2014/0181889 A1* | 6/2014 | Black | H04L 63/105 726/1 |
| 2014/0259100 A1* | 9/2014 | Li | H04L 63/0236 726/1 |
| 2014/0259168 A1* | 9/2014 | McNamee | H04L 63/145 726/23 |
| 2015/0135256 A1* | 5/2015 | Hoy | H04L 63/0227 726/1 |
| 2015/0200962 A1* | 7/2015 | Xu | G06F 21/566 726/23 |
| 2015/0237070 A1* | 8/2015 | Manmohan | G06F 21/53 726/1 |
| 2016/0057167 A1* | 2/2016 | Bach | H04L 63/101 726/23 |
| 2016/0087984 A1* | 3/2016 | Black | H04L 63/107 726/4 |
| 2017/0118228 A1* | 4/2017 | Cp | G06F 21/566 |
| 2017/0237749 A1* | 8/2017 | Wood | H04L 63/145 726/23 |
| 2018/0020002 A1* | 1/2018 | Duca | G06F 21/572 |
| 2018/0084003 A1* | 3/2018 | Uriel | H04L 63/1483 |
| 2018/0343283 A1* | 11/2018 | Goutal | H04L 63/101 |
| 2019/0173921 A1* | 6/2019 | DiCorpo | G06F 21/56 |
| 2019/0251252 A1* | 8/2019 | Prakash | H04L 63/1416 |
| 2019/0356623 A1* | 11/2019 | Everton | H04L 51/12 |
| 2020/0092326 A1* | 3/2020 | Prakash | H04L 63/1483 |

OTHER PUBLICATIONS

G. Dini and I. S. L. Porta, "BLOBOT: BLOcking BOTs at the Doorstep," 2009 Fourth International Multi-Conference on Computing in the Global Information Technology, Cannes, La Bocca, 2009, pp. 181-185, doi: 10.1109/ICCGI.2009.34. (Year: 2009).*

F. Leitold, A. Arrott and F. C. C. Osorio, "Combining commercial consensus and community crowd-sourced categorization of web sites for integrity against phishing and other web fraud," 2014 9th International Conference on Malicious and Unwanted Software: The Americas (Malware), Fajardo, PR, 2014. (Year: 2014).*

Jung Woo Young et al. Machine translation of KR 101265448 B1, originally published May 2013. (Year: 2013).*

* cited by examiner

ON-DEVICE NETWORK PROTECTION

TECHNICAL FIELD

The present invention is directed to protecting against network-based attacks on devices.

BACKGROUND

Connected mobile devices, such as smart phones, are constantly exposed to cyber threats on the Internet, and are especially vulnerable to spyware, botnets, phishing sites and other threats.

SUMMARY

The present invention provides methods and systems, performed on a computer device, such as a smart phone, i.e., locally, for protecting against network-based attacks by inspecting all traffic to every application and web browser on the device. This is done regardless of protocol, by intercepting and blocking malicious traffic. The methods and systems work on a device, locally on both iOS and Android devices, through an application. The application is such that it does not transmit or save user data and traffic information, and has little to no impact on network performance and device battery consumption.

The present invention is provided on the device (on-device), e.g., the smart phone of a user. By being on-device, the application of the present invention performs better than systems which redirect the traffic to outer server and analyze it there. This on-device logic allows for increased privacy and have better network performance, when compared to logic performed remote from the device.

The present invention performs enforcement on the device. The enforcement includes, both protection against malicious elements, such as phishing, malware and bot applications, as well as URL filtering, on the device. The present invention also provides for conditional access to various enterprises, should it detect the device is compromised, access to various enterprises, including their networks will be denied to the device.

Embodiments of the present invention are directed to a method for detecting a malicious connection of a computer device. The method comprises: performing on the computer device locally, steps comprising: intercepting the traffic associated with the computer device; analyzing the intercepted traffic for malicious connections by: 1) performing Uniform Resource Locator (URL) filtering of the traffic, and 2) applying rules and policies to the traffic; determining whether the URL filtering fails or the rules and policies have been violated; passing the traffic to its intended destination or to the computer device, if the URL filtering has not failed and the rules and policies have not been violated; and, blocking the traffic if the URL filtering fails or the rules and policies have been violated.

Optionally, the method is such that it additionally comprises: after the traffic has been intercepted, injecting anti-phishing logic into the intercepted traffic.

Optionally, the method is such that computer device includes a smartphone.

Optionally, the method is such that the blocking the traffic includes one or more of: redirecting the intercepted traffic to a block page, notifying the user of the device that the destination URL was blocked, and creating a report for the traffic having been blocked.

Optionally, the method is such that the URL filtering includes obtaining URLs associated with categories, for which traffic is to be blocked, from a reputation service over a network.

Optionally, the method is such that the applying rules and policies are used to detect at least one BOT applications or risks on the device.

Optionally, the method is such that if a BOT application is detected, quarantining the BOT application and blocking traffic from the BOT application.

Optionally, the method is such that if a risk on the device is detected, blocking the device from accessing predetermined domains or networks.

Optionally, the method is such that it the rules and policies are received from a management system over a network.

Optionally, the method is such that the analyzing the intercepted traffic for malicious connections by: 1) performing Uniform Resource Locator (URL) filtering of the traffic, and 2) applying rules and policies to the traffic, is performed contemporaneously.

Embodiments of the invention are directed to a computer system for detecting a malicious connection of a computer device. The system comprises: a storage medium for storing computer components on the computer device; and, a computerized processor for executing the computer components on the computer device. The computer components comprise: a first component for intercepting the traffic associated with the computer device; a second component for analyzing the intercepted traffic for malicious connections by: 1) performing Uniform Resource Locator (URL) filtering of the traffic, and 2) applying rules and policies to the traffic; a third component for determining whether the URL filtering fails or the rules and policies have been violated; and, a fourth component for; 1) passing the traffic to its intended destination or to the computer device, if the URL filtering has not failed and the rules and policies have not been violated; and, 2) blocking the traffic if the URL filtering fails or the rules and policies have been violated.

Optionally, the computer system is such that the computer device includes a smartphone.

Optionally, the computer system is such that the fourth component for blocking the traffic is additionally configured for one or more of: redirecting the intercepted traffic to a block page, notifying the user of the device that the destination URL was blocked, and creating a report for the traffic having been blocked.

Embodiments of the present invention are also directed to a computer-usable non-transitory storage medium having a computer program embodied thereon for causing a suitable programmed system on a computer device for detecting a malicious connection of a computer device, by performing the following steps when such program is executed on the system. The he steps comprising: intercepting the traffic associated with the computer device; analyzing the intercepted traffic for malicious connections by: 1) performing Uniform Resource Locator (URL) filtering of the traffic, and 2) applying rules and policies to the traffic; determining whether the URL filtering fails or the rules and policies have been violated; passing the traffic to its intended destination or to the computer device, if the URL filtering has not failed and the rules and policies have not been violated; and, blocking the traffic if the URL filtering fails or the rules and policies have been violated.

Optionally, the computer-usable non-transitory storage medium is such that it additionally comprises: after the traffic has been intercepted, injecting anti-phishing logic into the intercepted traffic.

Optionally, the computer-usable non-transitory storage medium is such that the computer device includes a smartphone.

Optionally, the computer-usable non-transitory storage medium is such that the blocking the traffic includes one or more of: redirecting the intercepted traffic to a block page, notifying the user of the device that the destination URL was blocked, and creating a report for the traffic having been blocked.

Optionally, the computer-usable non-transitory storage medium is such that the URL filtering includes obtaining URLs associated with categories, for which traffic is to be blocked, from a reputation service over a network.

Optionally, the computer-usable non-transitory storage medium is such that the applying rules and policies are used to detect at least one BOT applications or risks on the device.

Optionally, the computer-usable non-transitory storage medium is such that: 1) if a BOT application is detected, quarantining the BOT application and blocking traffic from the BOT application; or 2) if a risk on the device is detected, blocking the device from accessing predetermined domains or networks.

This document references terms that are used consistently or interchangeably herein. These terms, including variations thereof, are as follows.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over networks including the Internet.

"n" and "$n^{th}$" in the description below and the drawing figures represents the last member of a series or sequence of members, such as elements, servers, databases, caches, components, listings, links, data files, etc.

A "computer" includes machines, computers and computing or computer systems (for example, physically separate locations or devices), servers, computer and computerized devices (devices), processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices (also known as "devices") that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1A:
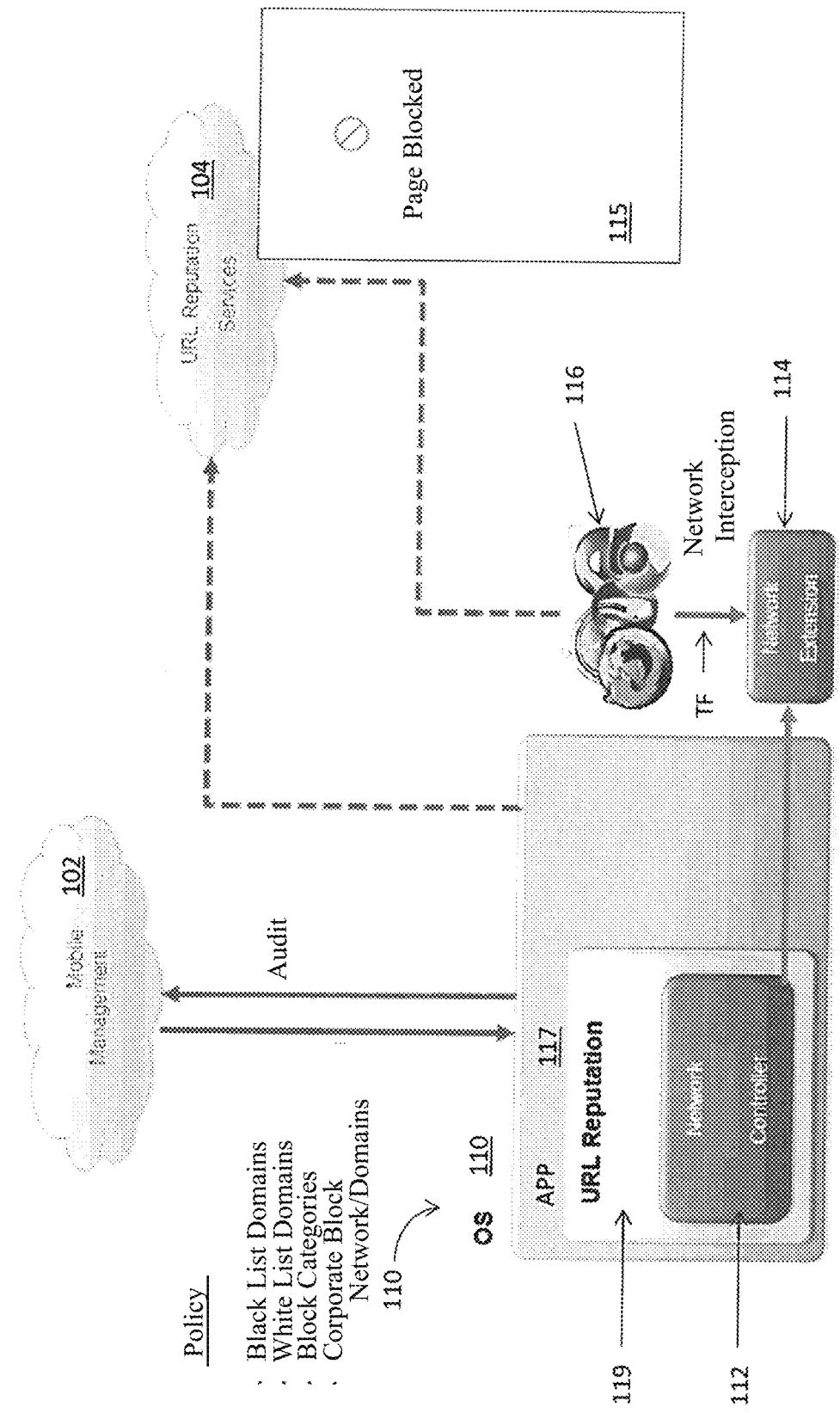
FIG. 1A is a diagram of an exemplary environment for the invention.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks. These trademarks are the property of their respective owners, and are referenced only for explanation purposes herein.

The present invention provides on-device network protection, by cross-referencing network content coming from the device against rules and policies, and analyzes the mobile domain and the context of the traffic. This results in maximum security with minimal false-positives.

The invention uses local Secure Socket Layer (SSL) Inspection technology, on the device, to also inspect protected connection traffic.

Once the inspection detects a malicious connection, it immediately blocks it on the device and alerts the user.

The system notifies the user of security incidents in several ways. First, the user is informed that the intended URL was blocked and why it was blocked, with local notification pop-up alerts. Second, the browser of the device is redirected to a special block page when the origin of the connection is a browser, or browser's component, explaining the action to the user within the browser's window. The administrator can customize the content and graphics of the block page, and determine operations other than block, such as Inform and Ask, allowing the user to decide and justify access. Third, the system sends an audit report to a centralized management console, over a network and lists the incident within the application of the invention.

FIG. 1A shows an example environment for the system of the invention, the system on the device 100. A device, such as a smart phone 100, is linked to one or more management servers (not shown) in the cloud 102. The management server(s) provides the system of the device 100 with rules and policies for detecting malicious elements, including for example, phishing detection, malware detection and bot detection. The device is also linked to one or more servers (not shown) of a reputation service in the cloud 104, for URL filtering. "Linked" as used herein includes both wired or wireless links, either direct or indirect, and placing the computers, including, servers, devices (e.g., smartphones), components and the like, in electronic and/or data communications with each other.

Figure 1B:
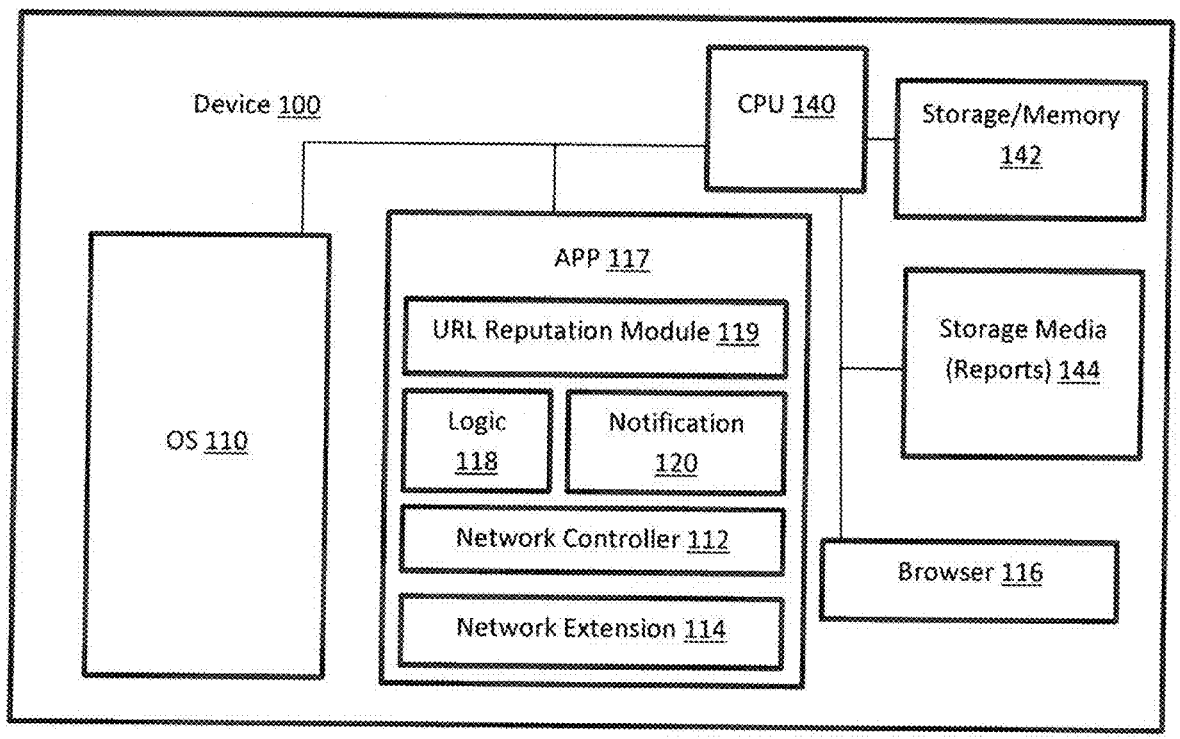
FIG. 1B is a block diagram of the architecture from a mobile device used with the invention; and, FIGS. 2A and 2B are a flow diagram detailing a process in accordance with embodiments of the invention.

Turning also to FIG. 1B, the device 100 includes an operating system (OS) 110, for example, Android® from Google or iOS® from Apple. The device also includes a network controller 112, and a network extension 114. The network controller 112 receives rules and policies from the management servers of the management control system 102. The rules and policies received may be for example, black listed domains, white listed domains, URL or domain categories to automatically be blocked, networks and enterprises for which traffic thereto or therefrom is be blocked, lists of malicious applications, and the like.

The administrator (or the management server(s)) or other system controlling entity, can configure a black list of domains to block additional domains. In addition, the white list domains configuration allows the administrator to override the system's pre-set controls, and allow access to sites that are blocked by the default configuration.

The network extension 114 is controlled by the network controller 112. The network extension 114, when instructed by the network controller 112, intercepts traffic both into and out of the device 100. The network extension 114 either passes, drops or redirects the intercepted traffic, to a block page 115. The network extension 114 may also notify the user of the device 100 of this traffic blocking.

An application such as a browser 116 is installed on the device 100.

The device 100 also receives, and has installed an application (APP) 117. This application 117 is in electronic and data communication with the management servers (in the cloud 102), to receive rules and policies for detecting and acting on or otherwise mitigating, malicious elements.

The application (APP) 117 activates the network controller 112, which in turn, activates the network extension 114, controlled by the network controller 112. The network extension 114 intercepts traffic TF from the browser 116.

The intercepted traffic TF is subjected to rule and policy matching and enforcement, and URL filtering, by the network controller 112, to determine whether the traffic TF is malicious. For example, should the rules and policies match fail and/or the URL be of an unreputable domain, the traffic is blocked, for example and directed to a block page 115, allowing the device 100 user to see why the traffic was blocked.

A logic module 118, created by the APP 117 upon its being installed on the device 100, provides anti phishing logic into the intercepted traffic. The logic injected from the logic module 118 includes, for example, Java Script code which is initiated on web form pages, and checks that the trustee of the web page is valid, before the user can actually type information into the fields of the web forms.

A URL Reputation module 119 is created by the APP 117, and installed on the device 100. This module 119 interacts with the Reputation Service (of cloud 104) by URL Filtering, for example, by crossing (comparing and analyzing) domains and full URLs and URL categories obtained from the Reputation Service, whether the URL or the URL category of the traffic is of a passable reputation. Such non-passable URLs include those with reputations for pornography, alcohol, cigarettes, pharmaceuticals, casinos, gambling, and other adult content, as well as phishing, spam and instant chat, which once detected, the traffic from the smartphone 100 to these non-policy compliant reputation URLs is blocked.

A notification module 120 serves to notify the device 100 user of security incidents in multiple ways. First, the notification module 120 informs the device 100 user about the URL that was blocked and why it was blocked with local notification pop-up alerts. Also, the traffic is directed to special block page 115, when the origin of the connection is a browser, or browser's component, explaining the action to the user within the browser's window. A system administrator or other system controlling entity, for example, via a network, can customize the content and graphics of the block page, and determine operations other than block, such as Inform and Ask, allowing the device 100 user to decide and justify access. The notification module 120 can also send an audit report to the management server in the mobile device management system 102, listing the incident within the APP 117.

The device 100 includes a Central Processing Unit (CPU) 140, formed of one or more processors, including microprocessors, and storage/memory 142. The storage/memory 142 is associated with the CPU 140, and is any conventional storage media. The storage/memory 142 also includes machine executable instructions associated with the operation of the CPU 140 and the components 112, 114, 116, 117, 118, 119, 120, along with the processes and subprocesses shown in FIG. 2, detailed herein. For example, both the CPU 140 and the storage/memory 142 are part of the device 100 as manufactured.

There is also storage media 144 for storing reports, other data as to malicious elements, and the like, which is also part of the device 100 as manufactured, and programmed by the APP 117.

Figure 2A:
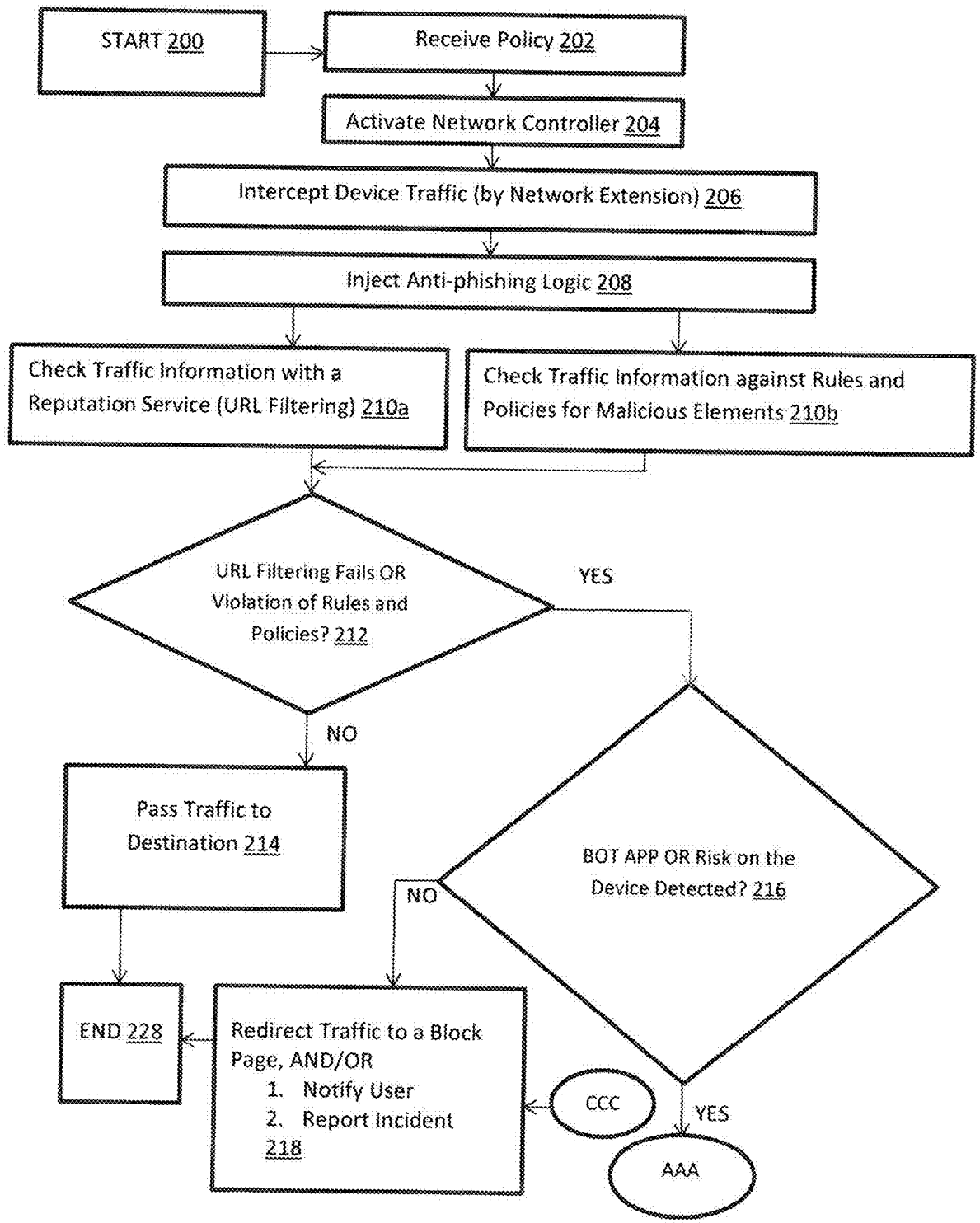
Figure 2B:
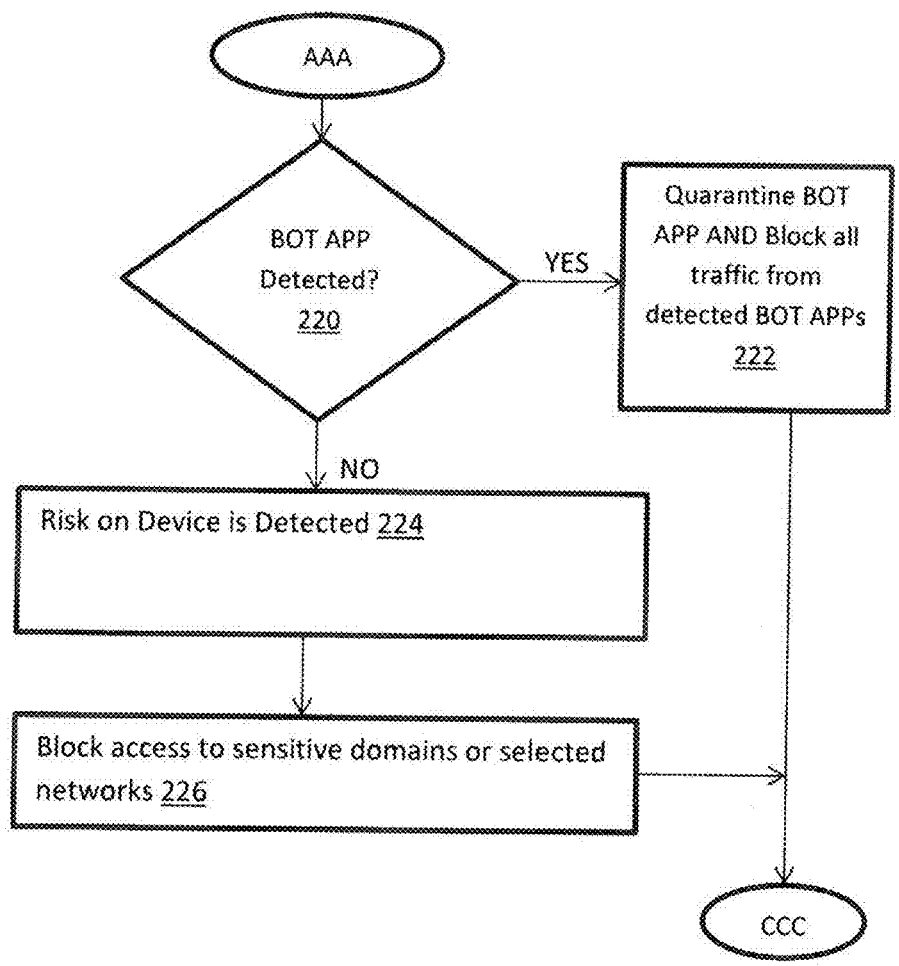

Attention is now directed to FIGS. 2A and 2B, which showy a flow diagram detailing computer-implemented processes in accordance with embodiments of the disclosed subject matter. Reference is also made to elements shown in FIGS. 1A and 1B. The process and subprocesses of FIGS. 2A and 2B are computerized processes performed by the OS 110, APP 117, Network Controller 112, Network Extension 114 and browser 116, on the device 100. The OS 110, browser 116, APP 117, including the Network Controller 112, Network Extension 114, logic module 118, URL Reputation Module 119, and notification module 120, are collectively referred to herein as the "system". The aforementioned processes and sub-processes can be, for example, performed manually, automatically, or a combination thereof, and, for example, in real time.

Initially, at the START block 200, the APP 117 is installed on the device, and the APP 117 is running on the device 100. The process moves to block 202, where the APP 117 receives a policy from the management server(s) in the cloud 102. The policy includes, for example, blacklisted domains, white listed domains, blocked categories, e.g., adult content, casino gaming, and blocked enterprises, e.g., domains. The APP 117 then activates the network controller 112, at block 204.

Moving to block 206, the network controller 112 instructs the network extension 114 to intercept traffic, which the network extension 114 does. Moving to block 208, anti-phishing logic is injected into the intercepted traffic (e.g., information associated therewith). This anti-phishing logic includes, for example, Java Script code which is initiated on web form pages, and checks that the trustee of the web page is valid, before the user can actually type information into the fields of the web forms, which is injected into the browser 116 of the device 100, to prevent the user from inputting sensitive information or compromised from a detected Phishing site. Phishing sites are detected by coupling a URL reputation service 104, e.g., which provides reputations for domains, the domain has a reputation for being a phishing site with an agent in the browser 116, which detects non-reputable domains, including those that have a phishing reputation (Domains/URLs is from a reputation category "Phishing"), by checking the domain with the reputation service 104, and blocks suspicious phishing behavior. By combining machine learning and advanced security methods, zero phishing protection not only inspects and blocks malicious traffic, but also locally injects Java Script logic to incoming pages, allowing the APP 117 to block type-sensitive information in web forms from phishing sites that are set-up to spoof legitimate sites.

From block 208, the process moves to blocks 210a and 210b, contemporaneously, including simultaneously.

At block 210a, the intercepted traffic is subjected to URL filtering, for example, by the URL Reputation Module 119 checking the URLs in the traffic TF against those from a reputation service, such as the reputation service in the cloud 104.

At block 210b, the aforementioned information associated with the intercepted traffic TF is checked against the rules and policies previously received by the APP 117 from the management server(s) (in the cloud 102), for example, by rules matching processes, or "rules matching".

From blocks 210a and 210b, the process moves to block 212, where the system determines whether the URL filtering failed (i.e., a non-reputable URL, including a URL from a category which is to be blocked, was detected), or there was a rules and policies violation. If no at block 212, the traffic is passed to its destination, by the network extension 114, at block 214, and the process moves to block 228, where it ends.

Returning to block 212, if yes, the process moves to block 216, as URL filtering has failed and/or rules and policies were violated. At block 216, the system determines whether a Bot APP has been detected or a risk on the device has been detected.

If no at block 216, domains which violate the rules and policies or have a reputation for non-permitted content, have been detected. For example, a blacklisted domain was detected in violation of rules and policies, or a domain with a reputation for non-permitted content, such reputations for pornography, alcohol, cigarettes, pharmaceuticals, casinos, gambling, and other adult content, as well as phishing, spam and instant chat. The process moves to block 218, where the network extension 114 directs the traffic to a block page 115, and the notification module 120 may notify the user of this traffic block (traffic not passed to its destination URL), and the incident is reported to the management server(s) of cloud 102, as part of an audit, as shown in FIG. 1A. For example, the APP 117, i.e., the notification module 120, sends an audit report to the management server(s) (of the management system 102 in the cloud) over a network and lists the incident in the APP 117, so as to be on the device 100.

If yes at block 216, a Bot APP or risk on the device has been detected. The process moves to block 220, where it is determined whether a Bot APP has been detected. The Bot APP detection is based on the network extension controller 112 having received the list of malicious apps from a mobile device management server in the cloud 102. If a Bot APP (an infected APP on the device 100) has been detected, at block 220 by performing a look up of the list of malicious apps, the process moves to block 222, where the Bot APP is quarantined and the associated intercepted traffic, regardless of its reputation, is blocked, whereby the APP 117 prevents the device 100 from leaking data or communicating with its command and control servers, such as those in the cloud 102. From block 222, the process moves to block 218, from where it resumes and ultimately ends, at block 228, as detailed above.

Returning to block 220, if no at block 220, the process moves to block 224, where a risk on the device 100 has been detected, by a violation of the rules and policies or a non-reputable URL. Here, the rules and polices received from the management server in the cloud 102, for example, as defined by a system administrator, may define or specify sensitive enterprise networks or domains, automatically blocking access, if the security posture of the device 100 has been compromised, at block 226. Additionally, at block 226, the received rules and policies provide on-device network protection capabilities to block device 100 access to corporate cloud resources, based on the same technological capabilities.

From block 226, the process moves to block 218, from where it resumes and ultimately ends, at block 228, as detailed above.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for detecting a malicious connection of a mobile computer device comprising:
   executing locally on the mobile computer device an application installed on the mobile computer, wherein the executing of the application causes the application to locally perform on the mobile computer device steps comprising:
      activating a first computer component to intercept traffic associated with the mobile computer device;
      activating a second computer component to analyze the intercepted traffic for malicious connections by: 1) performing Uniform Resource Locator (URL) filtering of the intercepted traffic, and 2) applying rules and policies to the intercepted traffic;
      tasking a third computer component to determine whether the URL filtering fails or the rules and policies have been violated; and
      tasking a fourth computer component to pass the intercepted traffic to its intended destination or to the computer device, if the URL filtering has not failed and the rules and policies have not been violated, and block the intercepted traffic if the URL filtering fails or the rules and policies have been violated,
   wherein the intercepted traffic includes at least browser traffic associated with a web browser installed on the mobile computer device, and wherein the steps performed by the application further comprise:
   creating a fifth computer component, and tasking the fifth computer component to inject anti-phishing logic into the browser traffic prior to the second computer component analyzing the intercepted traffic for malicious connections, the anti-phishing logic being initiated on at least one web form of a web page to check validity of the web page based on a reputation of a Uniform Resource Locator (URL) associated with the web page so as to prevent a user of the mobile computer device to provide input into the at least one web form while the third computer component determines whether the URL filtering fails or the rules and policies have been violated, and
   wherein at least one of the computer components is created by the application upon execution of the application.

2. The method of 1, wherein the mobile computer device includes a smartphone.

3. The method of claim 1, wherein blocking the intercepted traffic by the fourth computer component includes one or more of: redirecting the intercepted traffic to a block page, notifying the user of the mobile computer device that the destination URL was blocked, and creating a report for the intercepted traffic having been blocked.

4. The method of claim 1, wherein the URL filtering includes obtaining URLs associated with categories, for which traffic is to be blocked, from a reputation service over a network.

5. The method of claim 1, wherein the applying rules and policies are used to detect at least one BOT applications or risks on the device.

6. The method of claim 5, wherein if a BOT application is detected, quarantining the BOT application and blocking traffic from the BOT application.

7. The method of claim 5, wherein if a risk on the device is detected, blocking the device from accessing predetermined domains or networks.

8. The method of claim 1, wherein the rules and policies are received from a management system over a network.

9. The method of claim 1, wherein, analyzing the intercepted traffic for malicious connections by: 1) performing Uniform Resource Locator (URL) filtering of the intercepted traffic, and 2) applying rules and policies to the intercepted traffic, is performed by the second computer component contemporaneously.

10. A mobile computer device comprising:
   a storage medium for storing machine executable instructions associated with computer components on the mobile computer device, the computer components including an application installed on the mobile computer device; and
   a computerized processor for executing the machine executable instructions associated with the application so as to execute the application locally on the mobile computer device, wherein execution of the application causes the application to locally perform on the mobile computer device steps comprising:
      activating a first component of the computer components to intercept traffic associated with the mobile computer device;
      activating a second component of the computer components to analyze the intercepted traffic for malicious connections by: 1) performing Uniform Resource Locator (URL) filtering of the intercepted traffic, and 2) applying rules and policies to the intercepted traffic;
      tasking a third component of the computer components to determine whether the URL filtering fails or the rules and policies have been violated; and
      tasking a fourth component of the computer components to: 1) pass the intercepted traffic to its intended destination or to the computer device, if the URL filtering has not failed and the rules and policies have not been violated; and, 2) block the intercepted traffic if the URL filtering fails or the rules and policies have been violated,
   wherein the intercepted traffic includes at least browser traffic associated with a web browser installed on the mobile computer device, and wherein the steps performed by the application further comprise:
      tasking a fifth computer component to inject anti-phishing logic into the browser traffic prior to the second computer component analyzing the intercepted traffic for malicious connections, the anti-phishing logic being initiated on at least one web form of a web page to check validity of the web page based on a reputation of a Uniform Resource Locator (URL) associated with the web page so as to prevent a user of the mobile computer device to provide input into the at least one web form while the third computer component determines whether the URL filtering fails or the rules and policies have been violated, wherein at least one of the computer components is created by the application upon execution of the application.

11. The mobile computer device of claim 10, wherein the mobile computer device is implemented as a smartphone.

12. The mobile computer device of claim 10, wherein execution of the application additionally causes the application to actuate the fourth component of the computer components to perform one or more of: redirecting the intercepted traffic to a block page, notifying the user of the device that the destination URL was blocked, and creating a report for the intercepted traffic having been blocked.

13. A computer-usable non-transitory storage medium having a computer program embodied thereon for causing a suitable programmed system on a mobile computer device to detect a malicious connection of the mobile computer device, by performing the following steps when such program is executed on the system, the steps comprising:
  executing locally on the mobile computer device an application installed on the mobile computer, wherein the executing of the application causes the application to locally perform actions on the mobile computer device comprising:
    activate a first computer component of the system to intercept traffic associated with the computer device;
    activate a second computer component of the system to analyze the intercepted traffic for malicious connections by: 1) performing Uniform Resource Locator (URL) filtering of the intercepted traffic, and 2) applying rules and policies to the intercepted traffic;
    tasking a third computer component of the system to determine whether the URL filtering fails or the rules and policies have been violated;
    tasking a fourth computer component of the system to pass the intercepted traffic to its intended destination or to the computer device, if the URL filtering has not failed and the rules and policies have not been violated, and block the intercepted traffic if the URL filtering fails or the rules and policies have been violated,
  wherein the intercepted traffic includes at least browser traffic associated with a web browser installed on the mobile computer device, and wherein the actions performed by the application further comprise:
    creating a fifth computer component of the system, and tasking the fifth computer component to inject anti-phishing logic into the-browser traffic prior to the second computer component analyzing the intercepted traffic for malicious connections, the anti-phishing logic being initiated on at least one web form of a web page to check validity of the web page based on a reputation of a Uniform Resource Locator (URL) associated with the web page so as to prevent a user of the mobile computer device to provide input into the at least one web form while the third computer component determines whether the URL filtering fails or the rules and policies have been violated,
  wherein at least one of the computer components is created by the application upon execution of the application.

14. The computer-usable non-transitory storage medium of claim 13, wherein the mobile computer device includes a smartphone.

15. The computer-usable non-transitory storage medium of claim 13, wherein blocking the intercepted traffic includes one or more of: redirecting the intercepted traffic to a block page, notifying the user of the mobile computer device that the destination URL was blocked, and creating a report for the intercepted traffic having been blocked.

16. The computer-usable non-transitory storage medium of claim 13, wherein the URL filtering includes obtaining URLs associated with categories, for which traffic is to be blocked, from a reputation service over a network.

17. The computer-usable non-transitory storage medium of claim 13, wherein the applying rules and policies are used to detect at least one BOT applications or risks on the device.

18. The computer-usable non-transitory storage medium of claim 17, wherein: 1) if a BOT application is detected, quarantining the BOT application and blocking traffic from the BOT application; or 2) if a risk on the device is detected, blocking the device from accessing predetermined domains or networks.

* * * * *